March 12, 1940.  C. SEIPPEL  2,193,114
GAS TURBINE PLANT
Filed March 17, 1938  2 Sheets-Sheet 1
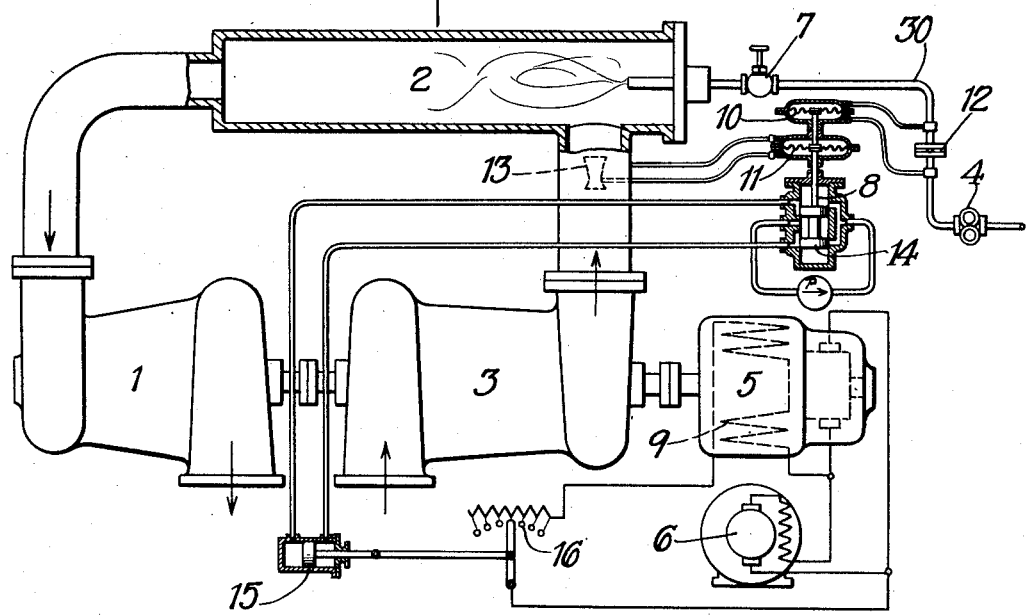
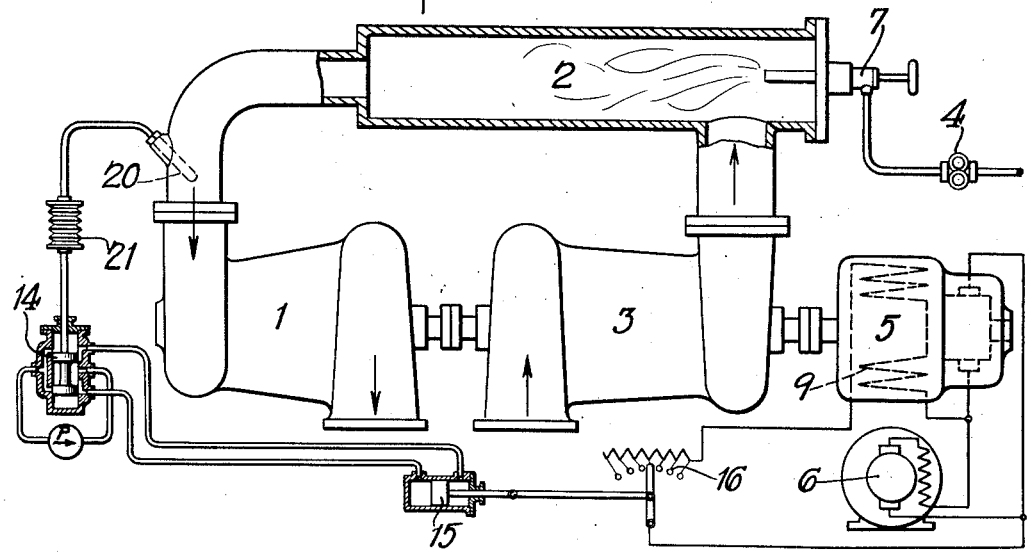
INVENTOR
CLAUDE SEIPPEL.
BY Karl A. Mayr
ATTORNEY

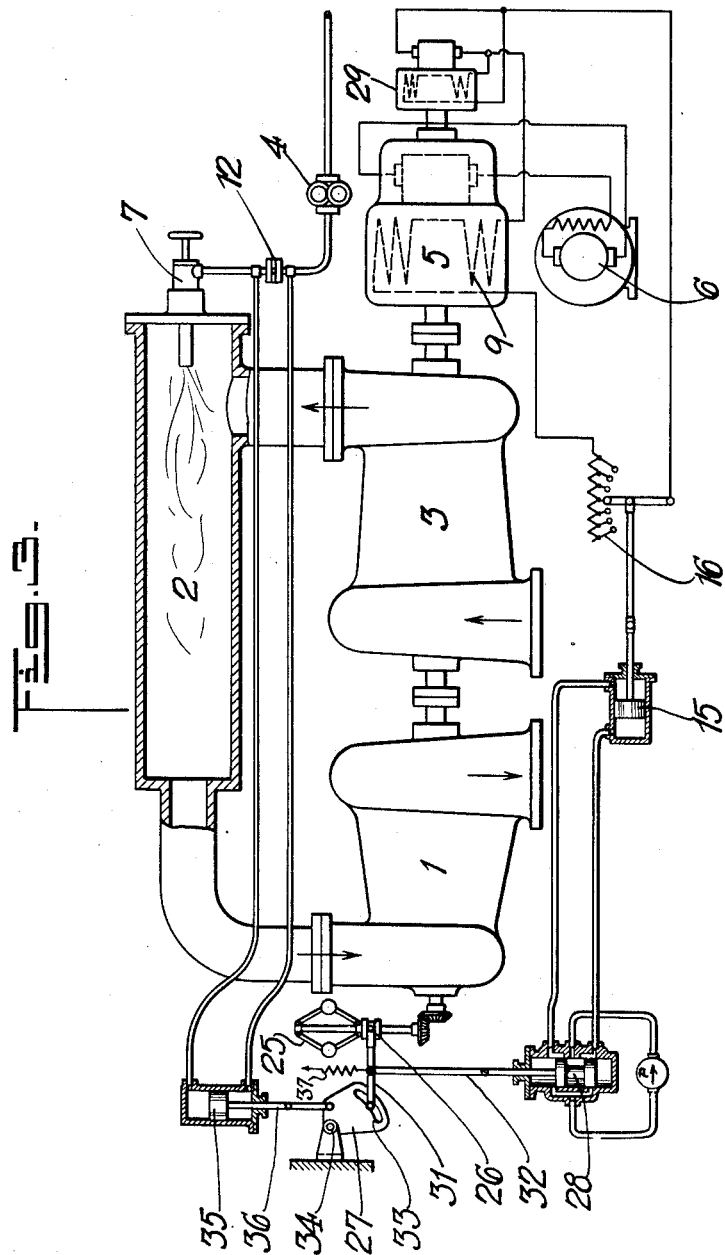

UNITED STATES PATENT OFFICE

2,193,114

GAS TURBINE PLANT

Claude Seippel, Ennetbaden, Switzerland, assignor to Aktiengesellschaft Brown, Boverie & Cie, Baden, Switzerland Application March 17, 1938, Serial No. 196,363
In Germany March 18, 1937

5 Claims. (Cl. 290—2)

The present invention relates to methods and means for controlling the operation of variable speed gas turbo-electric plants in which the gas turbine also drives the compressor for compressing the combustion air and/or the fuel gas.

It is an object of the present invention to provide a control method and means for plants of the type specified whereby the amount of fuel supplied to the plant as well as the excitation of the electric generator is definitely controlled.

It is an object of the present invention to provide a control method and means for plants of the type specified whereby the proportion of the amount of combustion air with respect to the amount of fuel supplied to operate the plant is correct at all load conditions of the plant.

It is a further object of the present invention to provide a control method and means for plants of the type specified whereby the compressor is operated at such speed that the air and/or fuel gas is compressed and delivered at best efficiency, i. e., with a minimum of power consumption, at all output conditions of the plant.

The speed of the compressor at which it operates at its best efficiency may be considerably different from the speed to which the gas turbo-generator adjusts itself when the load on the electric generator changes. It is a further object of the present invention to provide in a plant of the type set forth a regulating system whereby the gas turbo-generator set must always take on a speed which assures operation of the compressor which is also driven by the gas turbine at best compressor efficiency at various output conditions of the plant; this is accomplished, according to the present invention, by providing methods and means whereby the fuel supply is regulated and changed simultaneously with the excitation of the electric generator. In case of a direct current generator a change of the excitation causes a change of the electromagnetic field and thereby a change of the speed of the generator.

It is another object of the present invention to provide in a plant of the type described suitable means whereby the control of the excitation is so coupled with the fuel supply control that to the various amounts of fuel supplied a definite excitation of speed of the generator corresponds, independently from the various loads on the generator.

In many cases of the application of my present invention the fuel supply is controlled by hand, for example, when the system is used for supplying motive power, for example, in locomotives. In other cases the fuel supply is controlled automatically in dependence on the output demanded from the plant. In the present application various methods and means are disclosed for regulating the excitation in dependence on the amount of fuel supplied to the plant.

Further and other objects of the present invention will be hereinafter set forth in the accompanying specification and shown in the drawings which, by way of illustration show what I now consider to be a preferred embodiment of my invention.

In the drawings:

Figure 1 is a diagrammatic part sectional layout of a plant according to the present invention.

Figure 2 is a diagrammatic part sectional layout of a modification of the plant shown in Fig. 1.

Figure 3 is a diagrammatic part sectional layout of yet another modification of a plan according to the present invention.

Like parts are designated by like numerals in all figures of the drawing.

Referring more particularly to Fig. 1 of the drawing this figure shows an embodiment of the present invention in which the excitation and thereby the speed of the electric generator, compressor, and gas turbine is controlled by a control means which is responsive to the proportion of fuel and combustion air supplied. I represents the gas turbine which receives operating gas from the combustion chamber 2 in which air coming from compressor 3 and fuel supplied by the fuel pump 4 is burnt. 5 is the electric generator which in the case illustrated is a direct current generator and directly coupled to the blower 3 which is coupled and driven by the gas turbine I. The current generated is supplied to and drives the electric motor 6. The power produced by motor 6 is the object and final product of the plant. If the output of motor 6 must be changed this is done by manipulation of fuel supply control means 7 which in the case illustrated is a valve.

The compressor 3 must, at the same time, supply the correct amount of air, i. e., it must be operated at such speed that the desired amount of combustion air is furnished at best efficiency, i. e., lowest possible power consumption of the compressor 3. For this purpose an air-fuel mixture regulator 8 is provided which actuates the excitation 9 of generator 5 so that output and voltage demanded from the generator at various load conditions of the plant is produced at a speed most suitable for the operation of the turbine and particularly of the compressor. The air-fuel mixture regulator is of conventional design and comprises two diaphragms 10 and 11. Diaphragm 10 splits a chamber into two subchambers which are individually connected with the sides of an orifice plate 12 which is inserted in the fuel supply line 30 which connects the fuel pump 4 with the combustion chamber 2. Diaphragm 11 is operatively connected with diaphragm 10 and divides another chamber into two subchambers which are individually connected with the throat and outlet side of a Venturi tube 13 which is inserted in the combustion air supply conduit which connects compressor 3 and combustion chamber 2. Both diaphragms are operatively connected with a pilot valve 14 which controls the supply of an operating medium to the control piston 15 in the conventional manner. Control piston 15 is connected with and actuates rheostat 16 which regulates the flow of electric current through the exciter windings 9. As long as air and fuel supply are in correct proportion with respect to one another pilot piston 14 is in medium position; if the proportion of air and fuel is disturbed piston 14 is moved out of its medium position and the operating medium exerts a pressure on one side of piston 15 whereby this piston and thereby the rheostat 16 are moved out of their medium positions and the excitation and speed of generator 5 is changed; the speed of compressor 3 and the amount of air supplied is also changed. The control mechanism acts until the air supply is again in correct proportion to the fuel supply, i. e., until the speed of the compressor is such that the amount of air supplied is equal to the amount needed for efficiently burning the fuel supplied to combustion chamber 2.

In the embodiment of my invention illustrated in Fig. 2 instead of the air-fuel mixture regulator a temperature sensitive device such as a thermostat is used for regulating the exciter current. The temperatures of the gases produced in combustion chamber 2 are indicative of proper or improper combustion conditions. A thermostat 20 is provided in the path of the gases produced in chamber 2 in the embodiment of my invention shown in Fig. 2. This thermostat is arranged at the gas inlet to turbine 1. Thermostat 20, as shown, is hollow and interiorly connected with bellows 21 and filled with a heat expansible operating medium. The free end of bellows 21 is operatively connected with the pilot valve 14 which controls the flow of operating medium to control piston 15 which is connected with and adapted to operate rheostat 16. Upon a change of the temperature of the gases produced in chamber 2 the excitation of generator 5 is changed and thereby the speed of the generator and of the compressor 3, so that the air supply to combustion chamber 2 is changed.

Fig. 3 shows a layout of a plant according to the present invention in which the excitation is controlled in dependence on the speed of the gas turbine 1. For this purpose a speed governor 25 is provided which is operatively connected with and driven by the shaft of turbine 1 which also drives the compressor 3. To the sleeve 27 of governor 25 pilot piston 28 is connected by means of lever 31 and connecting rod 32. Lever 31 has an extension the end of which is adapted to be movably guided in slot 33 of guide member 27 which is swingable about a fulcrum 34 and moved about said fulcrum by means of the actuating piston 35 to which it is connected by a connecting rod 36. Definite contact of the end of lever 31 with member 27 is assured by means of a spring 37 which pulls said lever towards member 27. Connecting rod 32 is connected with and actuates pilot piston 28 which corresponds to pilot piston 14 in Figs. 1 and 2 and which regulates the supply of operating medium for the operation of the piston 15. The latter is connected with and operates the rheostat 16 for controlling the flow of electric current through exciter coils 9. In the plant shown in Fig. 3 an auxiliary generator 29 is provided for producing the excitation current. Pilot valve 28 is controlled by the amount of fuel flowing through the orifice disc 12 to combustion chamber 2 which amount is controlled by the manipulation of valve 7. If the amount of fuel supplied to chamber 2 is changed, by changing the excitation of generator 5, the speed of said generator and thereby the speed of blower 3 and gas turbine 1 and the amount of combustion air supplied to chamber 2 is also changed. To each amount of fuel supplied a definite amount of air must be coordinated. This amount of combustion air is determined by the speed at which blower 3 operates which speed is measured by the governor 25. The curve 33 and the dimensions of governor 25 are such that pilot valve 28 is placed in neutral position whenever the proportion of the amount of fuel supplied to the amount of air supplied is correct; when this proportion is not correct pilot valve 28 causes such supply of operating medium to piston 15 that the excitation and speed of generator 5 is changed until the speed is obtained which assures correct supply of combustion air.

The arrangements shown in Figs. 1 to 3 can be so constructed and/or adjusted that the change of the air supply is in advance of the change of the fuel supply after the first impulse to actuate the regulating system is given by a change in fuel supply; i. e., for example, if the fuel supply is increased by 10 percent, the power supply to the compressor 3 is increased, by proper design and setting of devices 14 to 16, so that the amount of air delivered by the compressor 3 is increased by, say, 12 percent.

While I believe at the present time the above described embodiments of my invention to be preferred embodiments, I wish it to be understood that I do not desire to be limited to the exact details of method, design and construction shown and described, for obvious modifications will occur to a person skilled in the art.

I claim:

1. A control system for a variable speed gas turbo-electric plant, said plant comprising a gas turbine, a combustion chamber for producing operating gas for said turbine, an air compressor connected to and being operated by said turbine and supplying combustion air to said combustion chamber, fuel supply means connected to and supplying fuel to said combustion chamber, an electric generator connected to and being operated by said turbine for producing electric power, said control system comprising fuel supply adjusting means operatively connected with said combustion chamber for adjusting the fuel supply to said chamber in accordance with the power demanded from said plant, means responsive to an operating condition of said combustion chamber, and excitation control means connected with said electric generator and with said last mentioned means and controlling the speed of said generator and turbine and compressor connected therewith in dependence on an operating condition of said combustion chamber and adjusting a compressor speed at which the required amount of combustion air is supplied to said combustion chamber at best compressor efficiency.

2. A control system for a variable speed gas turbo-electric plant, said plant comprising a gas turbine, a combustion chamber for producing operating gas for said turbine, an air compressor connected to and being operated by said turbine and supplying combustion air to said combustion chamber, fuel supply means connected to and supplying fuel to said combustion chamber, an electric generator connected to and being operated by said turbine for producing electric power, said control system comprising fuel supply adjusting means operatively connected with said combustion chamber for adjusting the fuel supply to said chamber in accordance with the power demanded from said plant, fuel flow responsive means associated with said fuel supply means, and excitation control means connected with said electric generator and with said fuel flow responsive means and controlling the speed of said generator and turbine and compressor connected therewith in dependence on the amount of fuel supplied to said combustion chamber and affording a compressor speed at which the required amount of combustion air is supplied to said combustion chamber at best compressor efficiency.

3. A control system for a variable speed gas turbo-electric plant, said plant comprising a gas turbine, a combustion chamber for producing operating gas for said turbine, an air compressor connected to and being operated by said turbine and supplying combustion air to said combustion chamber, fuel supply means connected to and supplying fuel to said combustion chamber, an electric generator connected to and being operated by said turbine for producing electric power, said control system comprising fuel supply adjusting means operatively connected with said combustion chamber for adjusting the fuel supply to said chamber in accordance with the power demanded from said plant, fuel flow responsive means associated with and being responsive to the amount of fuel supplied by said fuel supply means, speed responsive means connected with said gas turbine and being responsive to the speed thereof, and excitation control means connected with said electric generator and with said fuel flow responsive means and with said speed responsive means and controlling the speed of said generator and turbine and compressor connected therewith in dependence on the amount of fuel supplied to said combustion chamber and also on the speed of said turbine and affording a compressor speed at which the required amount of combustion air is supplied to said combustion chamber at best compressor efficiency.

4. A system for regulating the output of a variable speed gas turbo-electric plant, comprising, in combination, a gas producer, a gas turbine connected to and operated by gas from said gas producer, an air compressor connected to and being operated by said gas turbine and supplying air to said producer, an electric generator connected to and being driven by said turbine, fuel supply means connected with and supplying fuel to said gas producer, speed responsive means connected with said turbine and being responsive to the speed thereof, fuel supply responsive means connected with said fuel supply means and being responsive to the amount of fuel supplied thereby, and excitation control means connected with said generator and being operatively connected with and controlled by said speed as well as said fuel supply responsive means and controlling the speed of said generator and compressor connected therewith for supplying the required amount of combustion air at most efficient compressor speed.

5. A system for regulating the output of a variable speed gas turbine plant, comprising, in combination, a gas producer, a gas turbine connected with and receiving operating gas from said producer, an air compressor connected with and being operated by said gas turbine and supplying combustion air to said gas producer, fuel supply means connected to and supplying fuel to said gas producer, fuel supply responsive means connected with said fuel supply means and being responsive to the amount of fuel supplied, and speed control means connected with said air compressor and being operatively connected with and controlled by said fuel supply responsive means.

CLAUDE SEIPPEL.